United States Patent [19]

Sinclair

[11] Patent Number: 5,357,801
[45] Date of Patent: Oct. 25, 1994

[54] LIQUID-LEVEL GAUGING

[75] Inventor: David Sinclair, Chineham, England

[73] Assignee: Smiths Industries Public Limited Company, London, England

[21] Appl. No.: 103,636

[22] Filed: Aug. 11, 1993

[30] Foreign Application Priority Data

Aug. 29, 1992 [GB] United Kingdom ............... 9218425

[51] Int. Cl.$^5$ ............................................. G01F 23/28
[52] U.S. Cl. .................................. 73/290 V; 367/908; 367/99; 181/124
[58] Field of Search ............... 73/290 V; 367/908, 99; 181/123, 124

[56] References Cited

U.S. PATENT DOCUMENTS

| | | | |
|---|---|---|---|
| 3,394,589 | 7/1968 | Tomioka | 73/290 V |
| 4,909,080 | 3/1990 | Kikuta et al. | 73/290 V |
| 4,928,525 | 5/1990 | Aderholt et al. | 73/290 V |
| 5,095,748 | 3/1992 | Gregory et al. | 73/290 V |
| 5,119,676 | 6/1992 | Bower et al. | 73/290 V |
| 5,121,340 | 6/1992 | Campbell et al. | 73/290 V |

FOREIGN PATENT DOCUMENTS 0821939  4/1981  U.S.S.R. ................ 73/290 V
2185575  7/1987  United Kingdom .

OTHER PUBLICATIONS

WPI Abstract 87-13205/19, W. Rhurmann May 7, 1987 and Jul. 27, 1989 (only abstract considered).

Primary Examiner—Diego F. F. Gutierrez
Attorney, Agent, or Firm—Pollock, Vande Sande & Priddy

[57] ABSTRACT

An ultrasonic liquid level gauging sensor has a transducer at the lower end of a tube that is filled with liquid to the same height as liquid outside the tube. The sensor has an axial rod extending along the tube and supporting several calibration reflectors. The rod enables the sensor to be used at high tilt angles.

7 Claims, 1 Drawing Sheet

LIQUID-LEVEL GAUGING

BACKGROUND OF THE INVENTION

This invention relates to liquid-level gauging.

The invention is more particularly concerned with ultrasonic liquid-level gauging sensors.

Ultrasonic liquid-level sensors utilize the fact that ultrasonic vibrations travel freely in a liquid but are rapidly attenuated in air or other gas. If an ultrasonic transducer is mounted on the base of a liquid reservoir so that it directs energy up towards the liquid/air interface, the energy will be reflected back down to the transducer by this interface. By measuring the time taken between transnfission and reception of an energy pulse, it is possible to measure the distance between the transducer and the liquid/air interface and, from this, the depth of liquid.

It is conunon practice for ultrasonic transducers of this kind to be mounted at the lower end of a tube or still well that extends from the bottom to the top of the liquid reservoir. The tube is open at the bottom so that liquid fills the tube to the same depth as in the reservoir outside the tube. The tube serves several purposes. It helps isolate the transducer from other sensors or sources of interference. It also confines the ultrasonic beam, so that it is directed only at the region of the liquid surface directly above the transducer. Furthermore, the tube produces within it a region of liquid surface that is substantially damped of waves.

Another advantage arising out of the use of the tube is that it is easy to provide a reference height, by mounting some form of reflector at a known height within the tube. In this way, the transducer will receive a reflection from the liquid surface and one from the reference reflector against which the liquid height can be calibrated. This enables the ultrasonic gauging system to compensate for different liquids having different acoustic propagation properties and for temperature variations, which can affect ultra-sound propagation. Examples of ultrasonic probes having a tube of this kind are described in, for example, EP 0106677, GB 9304579 and GB 9304561.

There are various problems with existing ultrasonic liquid gauging sensors. One problem arises from the fact that the amplitude of energy reflected back to the sensor varies considerably with change in the angle of the liquid surface relative to the axis of the probe, such as caused by change in attitude of the probe. At angles exceeding about 20 degrees from the vertical, the signal return from the liquid surface can be below the lowest signal-to-noise ratio that is acceptable for reliable measurement of liquid height. In practice, the maximum working angle for presently available probes is about 30 degrees. Even at certain angles considerably less than this there can be blind spots where the return signal drops to a very low level.

Another problem with ultrasonic level sensors is that they are not suitable for use with some liquids, such as engine oil, because of the high attenuation of ultrasonic energy in these liquids. Although it is possible to measure the height of such liquids in a perfectly level, stationary tank, the slightest tilt or perturbation of the liquid surface increases the scattering and absorption, causing the return signal to drop below a usable level.

BRIEF SUMMARY OF THE INVENTION

It is an object of the present invention to provide an ultrasonic liquid level sensor that can be used to alleviate this problem.

According to one aspect of the present invention there is provided an ultrasonic liquid level sensor of the kind including an ultrasonic transducer mounted towards the lower end of a tube arranged to extend upwardly and to be filled with liquid to the same height as liquid outside the tube, the sensor including at least one rod extending within the tube along its length, the rod being effective to increase the range of operational tilt angles over which the sensor can be used.

It has been found that, by using a rod internally of the tube in this way, the range of angles over which the sensor can be used is greatly increased. It can also enable the sensor to be used with some liquids, such as engine oil, with which ultrasonic sensors have not previously been able to be used.

The rod may support a plurality of calibration reflectors. The rod may be solid and of a metal. A single rod may be used located axially of the tube. Alternatively, the sensor may have a plurality of rods equally spaced around the inside of the wall of the tube. The or each rod may be profiled at its lower end to reduce reflection from the rod at the lower end of the sensor. The or each rod may be of circular section.

An ultrasonic sensor for an aircraft fuel-gauging system, in accordance with the present invention, will now be described, by way of example, with reference to the accompanying drawings.

DETAILED DESCRIPTION OF THE PREFERRED EMBODIMENT

Figure 1:
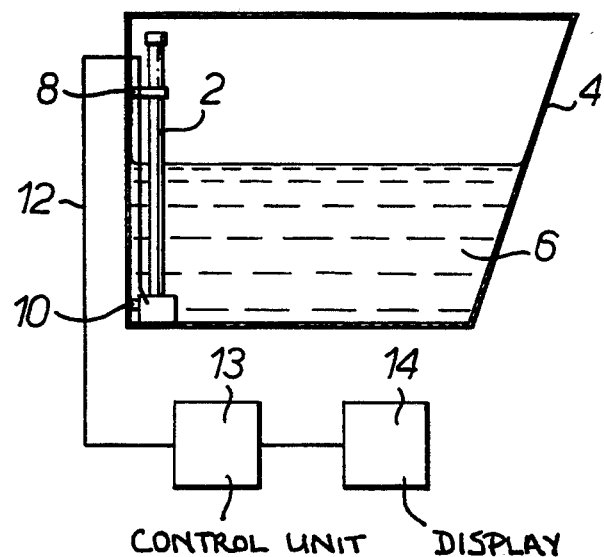
FIG. 1 is a side elevation view of the sensor in an aircraft fuel tank.

With reference to FIG. 1, the sensor 2 is mounted vertically in an aircraft tank 4 containing liquid fuel 6. The sensor 2 is supported by two clamps 8 and 10 secured to the upper and lower end of the sensor respectively and to the wall of the tank 4. The drive signal to the sensor and its electrical output are taken from the lower end of the sensor via a cable 12 to a control unit 13 including a fuel-gauging computer, which computes the volume of fuel from the height information provided by the sensor and from knowledge of the tank shape. The output from the control unit 13 is supplied to a display 14, or other utilization means, which may be in terms of either volume or mass if a density input is provided.

Figure 2:
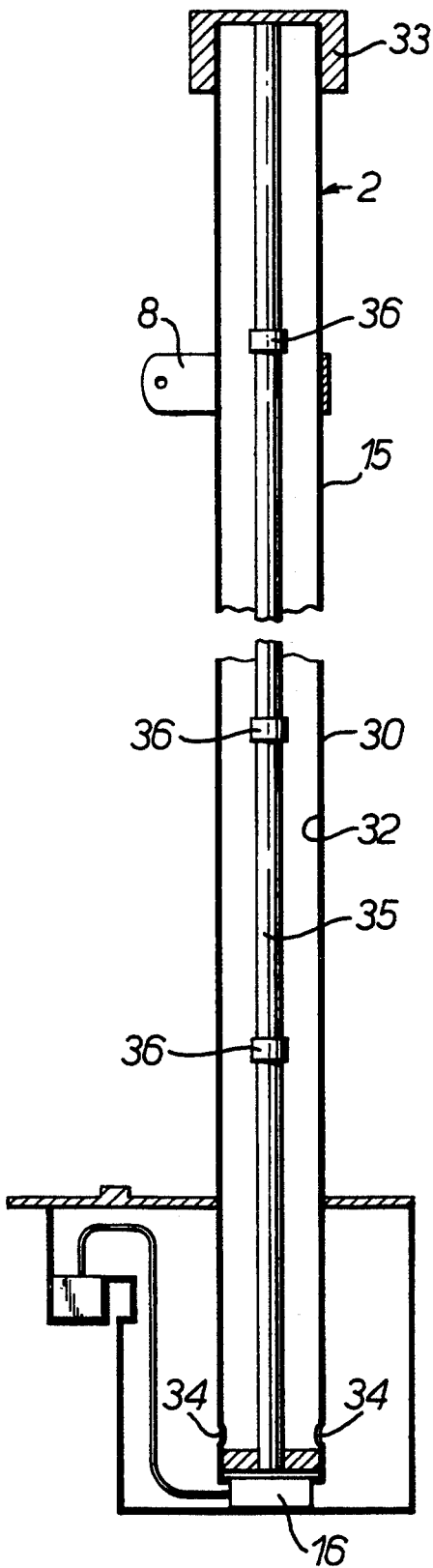
FIG. 2 is an enlarged sectional side elevation view of the sensor.

With reference now also to FIG. 2, the sensor 2 comprises a tubular assembly 15 and a transducer 16 mounted at its lower end.

The tubular assembly 15 may be up to about 3 m long and have an external diameter of about 25 mm. The assembly comprises a cylindrical tube 30 of metal, such as aluminum, which has a wall thickness of about 0.5 mm. Along its internal surface, the tube 30 is coated with a layer 32 of an acoustically-absorbing plastics material such as a two-part polysulphide or similar plastics material. The thickness of the coating is not critical and the coating can be carded out by any conventional technique such as by pouring the coating material in a liquid form through the tube. Alternatively, the tube may be of a different material, such as fibreglass or have a lining sleeve of, for example PTFE. At its upper end, the assembly 15 is closed by a cap 33 bonded to the tube 30. At its lower end, the assembly 15 is open to fuel within the tank through four equally-spaced apertures 34 around the lower end of the tube 30.

Along the major part of the length of the tubular assembly 15 there extends a solid metal rod 35, which may be of aluminum. Typically, the diameter of the rod is about 5 mm, although the diameter is not critical to operation of the sensor. The rod 35 extends axially of the tubular assembly 15 and has its lower end spaced above the transducer 16 by a distance of about 10 mm. At its upper end, the rod 35 is bonded to the cap 33. The rod 35 supports a number of calibration reflectors 36 in the form of annular collars equally spaced along the rod. These are used to reflect energy at known intervals against which the reflection from the liquid surface can be compared. Alternatively, calibration reflectors can be mounted on the inside of the tubular assembly, in the usual way.

The transducer 16 is typically a model MH100 transducer sold by Seacoustics Ltd although other ultrasonic transducers could be used.

In use, the control unit 13 energizes the transducer 16 with electrical pulses that cause the transducer to emit ultrasonic energy pulses with a frequency of about 1 MHz and a pulse repetition frequency of about 1 second. The ultrasonic energy is directed vertically upwards, along the axis of the tubular assembly 15. The beam of the energy is of polar shape, with a maximum width approximately equal to the internal diameter of the assembly.

Each pulse of ultrasonic energy travels axially up the assembly 15 within the fuel 6. Some of the energy will be reflected off the inside of the tubular assembly 15 and off the surface of the rod 35. The energy travels up the assembly 15 until it meets the interface with the air or gas in the tank 4 above the fuel 6. At this point the energy pulse is reflected downwardly back to the transducer 16. The transducer 16 also receives echo pulses arising from reflection from the collars 36, which provide calibration pulses against which the echo from the liquid surface can be calibrated. The coating 32 on the inside of the assembly 15 reduces the amount of energy transferred from the fuel within the assembly to the wall of the assembly and the amount of energy transferred from the wall to the fuel.

The rod 35 has surprisingly been found to cause a considerable increase in the amount of energy received by the transducer 16 from reflection off the fuel surface. This can lead to a ten-fold increase in received energy. It is believed that this is caused by both the additional meniscus produced around the rod 35 and by the increase in internal reflections caused by the rod. It has been found that, when the sensor 2 is tilted away from the vertical, there is very little reduction in energy received by the transducer 16. This enables the sensor to be used reliably at tilt angles down to about 85 degrees from the vertical, considerably greater than with previous ultrasonic level sensors. This ensures a high reliability of the fuel-gauging system in that changes in aircraft attitude will not adversely affect the accuracy of the system. It also gives the aircraft manufacturer greater flexibility in locating the liquid level sensors, in that these can be installed in orientations away from the vertical, if desired.

The use of an internal rod in the manner described above also enables the sensor to be used to measure the height of liquids, such as engine oil, that have not previously been suitable for ultrasonic level measurement. The considerably higher returned signal produced by the use of the rod overcomes the high attenuation of ultrasonic energy in certain liquids.

Various modifications are possible to the sensor. For example, it might be desirable to taper the rod, or form it with a similar to a taper profile at its lower end, so as to reduce the mount of energy reflected by the rod at the lower end of the sensor. The rod could vary in diameter from about 2 mm to about 20 mm with the tubular assembly described above, with very little effect on the sensor's performance. The rod need not be of circular section but could, for example, be of an oval, square or hexagonal section. The rod could be hollow and could be made of different materials, such as plastics having different ultrasonic transmission properties. More than one rod could be used and these could be mounted on the inside wall of the tubular assembly. Preferably, the rods are equally spaced around the inside of the wall of the tube since otherwise the amplitude of the return signal may vary according to the orientation in which the sensor is tilted. Where four rods are used, these would preferably be spaced around the tubular assembly at 90 degree intervals.

What I claim is:

1. An ultrasonic liquid-level sensor comprising:
a tube; means for mounting the tube in a liquid reservoir to extend upwardly; an opening in the tube through which the tube is filled with liquid from the reservoir to the same height as liquid outside the tube; an ultrasonic transducer located at a lower end of the tube; and at least one rod extending within the tube along its length, the rod increasing the amount of energy received by the transducer from reflection off the liquid surface so as thereby to increase the range of operational tilt angles over which the sensor can be used.

2. A sensor according to claim 1, including a plurality of calibration reflectors on the rod.

3. A sensor according to claim 1, wherein the rod is solid.

4. A sensor according to claim 1, wherein the rod is made of metal.

5. A sensor according to claim 1, wherein the rod is located axially of the tube.

6. A sensor according claim 1, wherein the rod is of circular section.

7. An ultrasonic liquid-level sensor comprising:
a tube; means for mounting the tube in a liquid reservoir to extend upwardly; an opening in the tube through which the tube is filled with liquid from the reservoir to the same height as liquid outside the tube; an ultrasonic transducer located at a lower end of the tube; a rod extending axially within the tube along its length; and a plurality of calibration reflectors on the rod, and wherein the rod increases the amount of energy received by the transducer from reflection off the liquid surface so as thereby to increase the range of operational tilt angles over which the sensor can be used.

* * * * *